(12) United States Patent
Eastman et al.

(10) Patent No.: US 7,544,043 B2
(45) Date of Patent: Jun. 9, 2009

(54) TURBULATOR ON THE UNDERSIDE OF A TURBINE BLADE TIP TURN AND RELATED METHOD

(75) Inventors: John Alan Eastman, Simpsonville, SC (US); Matthew James Findlay, Simpsonville, SC (US); Jon Allen Ebacher, Spartanburg, SC (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 11/491,957

(22) Filed: Jul. 25, 2006

(65) Prior Publication Data

US 2006/0257256 A1    Nov. 16, 2006

Related U.S. Application Data

(63) Continuation of application No. 10/832,252, filed on Apr. 27, 2004, now Pat. No. 7,137,782.

(51) Int. Cl.
*F01D 5/18*    (2006.01)

(52) U.S. Cl. .................................................. 416/96 R
(58) Field of Classification Search ................ 416/96 A
See application file for complete search history.

(56) References Cited

U.S. PATENT DOCUMENTS

| | | | | |
|---|---|---|---|---|
| 2,920,865 | A | * | 1/1960 | Lombard .................. 416/97 R |
| 4,992,026 | A | * | 2/1991 | Ohtomo et al. ........... 416/97 R |
| 5,536,143 | A | | 7/1996 | Jacala et al. |
| 6,474,947 | B1 | | 11/2002 | Yuri |
| 6,939,102 | B2 | * | 9/2005 | Liang .......................... 415/115 |

* cited by examiner

*Primary Examiner*—Richard Edgar
(74) *Attorney, Agent, or Firm*—Nixon & Vanderhye, P.C.

(57) ABSTRACT

A turbine blade includes a shank portion and an airfoil portion with leading and trailing edges and a radially outer tip. An internal closed-loop cooling circuit is formed within the airfoil portion and includes at least one radial outflow passage and at least one radial inflow passage connected by at least one respective tip turn at the radially outer end of the airfoil portion. At least one tip turn is provided with a single turbulence-enhancement device on an underside of the radially outer tip, projecting into the tip turn.

24 Claims, 3 Drawing Sheets

TURBULATOR ON THE UNDERSIDE OF A TURBINE BLADE TIP TURN AND RELATED METHOD

This application is a continuation of U.S. patent application Ser. No. 10/832,252, filed Apr. 27, 2004, now U.S. Pat. No. 7,137,782.

BACKGROUND OF THE INVENTION

This invention relates generally to the cooling of turbine blades and, more specifically, to a turbulence-enhancing mechanism on the underside of a tip turn of a cooling passage in a closed-circuit steam-cooled turbine blade.

In a closed-circuit steam-cooled turbine blade, effective cooling of the radially outer tip region is critical for the life of the part. Unlike a typical air-cooled turbine blade where the coolant can be erected through holes in the blade to provide a relatively cool film over the surface to protect the part, all of the cooling capacity in a steam-cooled turbine blade must come from inside the machine. Heat transfer enhancement, relative to that of a flat plate or pipe configuration, occurs at the tip turns due to the turning of the flow in the serpentine circuit, and is typically sufficient to cool the tip region of the blade under normal operating conditions. However, in the event of a failure in the thermal barrier coating at the tip of the blade, it is desirable to have enhanced heat transfer on the interior surface of the tip in order to maintain metal temperatures below reasonable limits.

The cooling of turbine blade tip regions or tip turns has been discussed in the patent literature. For example, U.S. Pat. No. 6,474,947 describes an air-cooled turbine blade incorporating a configuration of film holes to improve heat transfer in local zones of a typical tip turn. Commonly owned U.S. Pat. No. 5,536,143 relates specifically to the design of a closed-loop, steam-cooled turbine blade and describes the possibility of including turbulence-enhancing features at the tip. More specifically, the patent describes the use of multiple raised ribs of either rounded or square configuration to enhance heat transfer in the tip region. The disadvantage to the use of multiple features, however, is increased pressure loss associated with plural ribs.

BRIEF DESCRIPTION OF THE INVENTION

This invention provides enhanced heat transfer in the tip region of a closed-loop, steam-cooled turbine blade to reduce the risk associated with a loss of thermal barrier coating and, at the same time, minimizes additional pressure loss resulting from the addition of the turbulence-enhancing feature. In accordance with an exemplary embodiment, a single turbulator or heat transfer enhancement device is provided on the underside of the tip cap, adjacent the coolant flow tip turns at the radially outer end of the blade. This arrangement provides improved thermal protection in the event of thermal barrier coating failure and minimal pressure loss through the turn.

In the exemplary embodiment, a single turbulence-enhancing device or turbulator is in the form of an elongated rib incorporated as an integral part of a plug in the tip cap of the turbine blade. The casting process is such that holes are left in the top of the turbine blade, resulting from the supports of the internal casting core. These holes are closed in some fashion, either with a single plate over most or all of the tip or with individual plugs for each respective opening or hole. The turbulence-enhancement device can thus be incorporated not only as part of an integral plug, but also, as part of a one-piece plate with turbulators positioned on the plate so as to be situated adjacent each tip turn. The turbulator may be of generally square or rounded cross-section with varying effects on heat transfer enhancement and pressure drop through the turn. The turbulator may also be angled across the tip turn, aligned in the direction of flow (as a cooling fin), or aligned perpendicular to the direction of flow. Alternatively, a chevron-shaped rib may also be employed, oriented in the tip turn to achieve the desired effect.

Accordingly, in one aspect, the invention relates to a turbine blade having a shank portion and an airfoil portion with leading and trailing edges and a radially outer tip; an internal closed-loop cooling circuit within the airfoil portion including at least one radial outflow passage and at least one radial inflow passage connected by at least one respective tip turn at the radially outer end of the airfoil portion adjacent the radially outer tip, at least one tip turn having a single turbulence-enhancement device formed on an underside of the radially outer tip and projecting into the tip turn.

In another aspect, the invention relates to a turbine blade having a shank portion and an airfoil portion with leading and trailing edges and a radially outer tip; an internal closed-loop serpentine cooling circuit within the airfoil portion including plural radial outflow passages and plural radial inflow passages connected by plural respective tip turns at the radially outer end of the airfoil portion, and including a plurality of core support holes in the radially outer tip, each hole closed by a plug having not more than one elongated rib on an underside of the plug, projecting into a respective one of the tip turns.

In another aspect, the invention relates to a turbine blade having a shank portion and an airfoil portion with leading and trailing edges and a radially outer tip; an internal closed-loop serpentine cooling circuit within the airfoil portion including plural radial outflow passages and plural radial inflow passages connected by plural respective tip turns at the radially outer tip, and including a plurality of core support holes in the radially outer tip, each hole closed by a single plate covering a plurality of the core support holes having a plurality of ribs on the underside of the plate, but not more than one elongated rib on an underside of the plate projecting into a respective one of the tip turns.

In still another aspect, the invention relates to a method of enhancing heat transfer in a respective, closed-loop cooling circuit formed within an airfoil portion of a gas turbine blade, the circuit including a plurality of radiant outflow passages and a plurality of radial inflow passages connected by respective tip turns adjacent an airfoil tip having core support holes therein, the method comprising a) closing the core support holes with respective plugs; and b) forming a single elongated rib on an underside of each plug, such that the rib projects into the tip turn.

The invention will now be described in detail in connection with the drawings identified below.

DETAILED DESCRIPTION OF THE INVENTION

Figure 1:
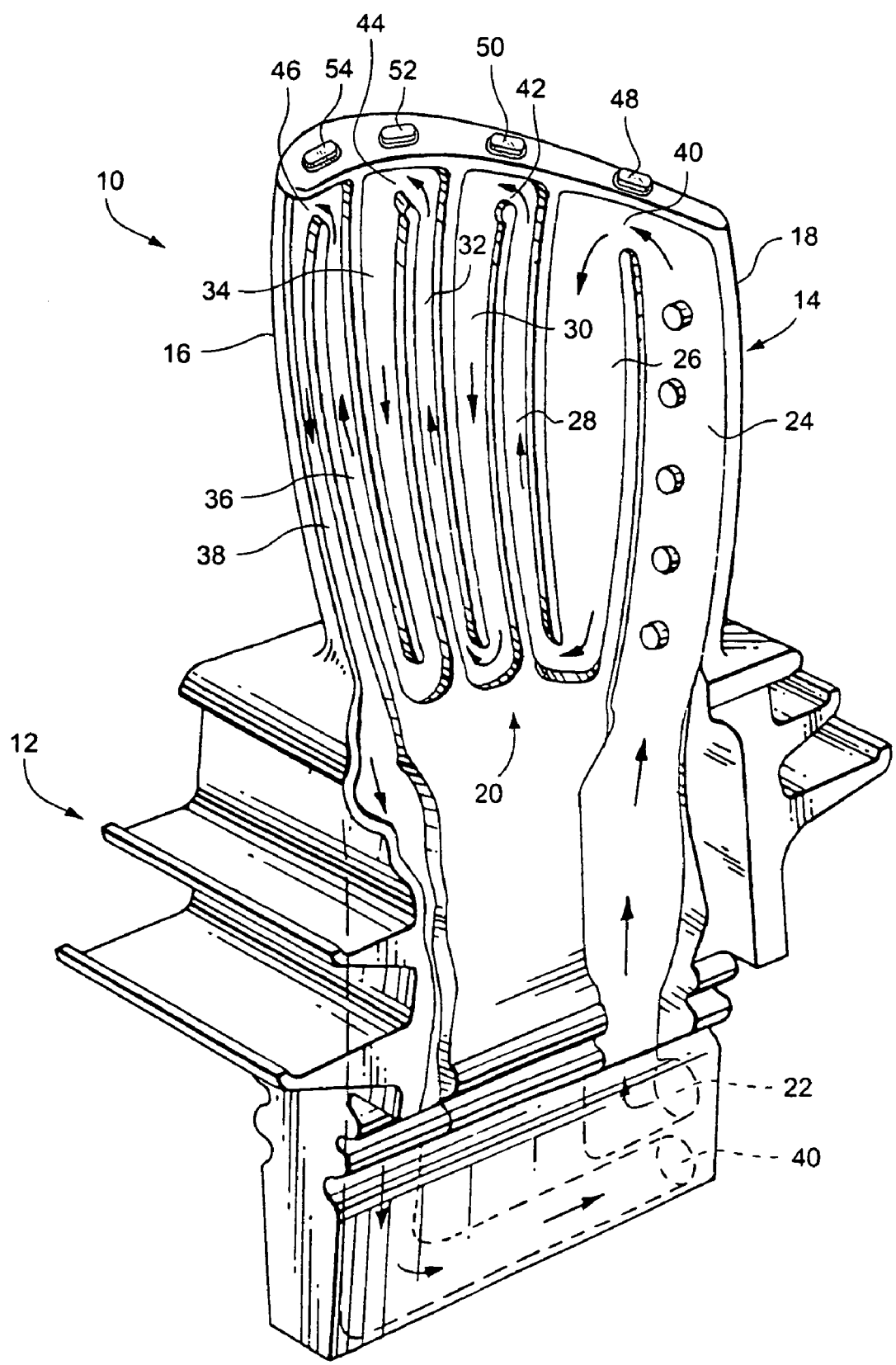
FIG. 1 is a perspective view of a turbine blade showing an internal closed loop cooling circuit.

With reference to FIG. 1, there is shown in simplified form a turbine blade 10 having shank portion 12 and an airfoil portion 14. The airfoil portion 14 is formed with respective leading and trailing edges 16, 18. A closed-loop, serpentine cooling circuit 20 is formed within the airfoil portion. Cooling steam entering the blade 10 via inlet 22 flows through the single closed serpentine circuit 20 having a total of, for example, eight radially extending passages 24, 26, 28, 30, 32, 34, 36 and 38 connected alternately by 180° return U-bends 40, 42, 44 and 46. Inlet 22 thus communicates with the first radial outflow passage 24, and the last radial inflow passage 38 communicates with outlet 40. The total number of radial passages may vary in accordance with the specific design criteria. The cooling steam could also enter the blade via 40 and flow in the opposite direction to the arrows shown, exiting at 22. In addition, the invention is not restricted to a single serpentine circuit.

The tip turn regions correspond to the inverted U-bends 40, 42, 44 and 46 located at the outermost radial end of the cooling passages, and plugs 48, 50, 52 and 54 are shown in place, closing the holes in the tip of the turbine blade resulting from the core supports during casting of the blade. In accordance with an exemplary embodiment, each of the plugs incorporates a single turbulence enhancing mechanism or device on its underside, i.e., projecting into the cooling circuit in the tip turn region. Since the plugs and their respective turbulence-enhancement features are substantially identical, only one need be described in detail.

Figure 2:
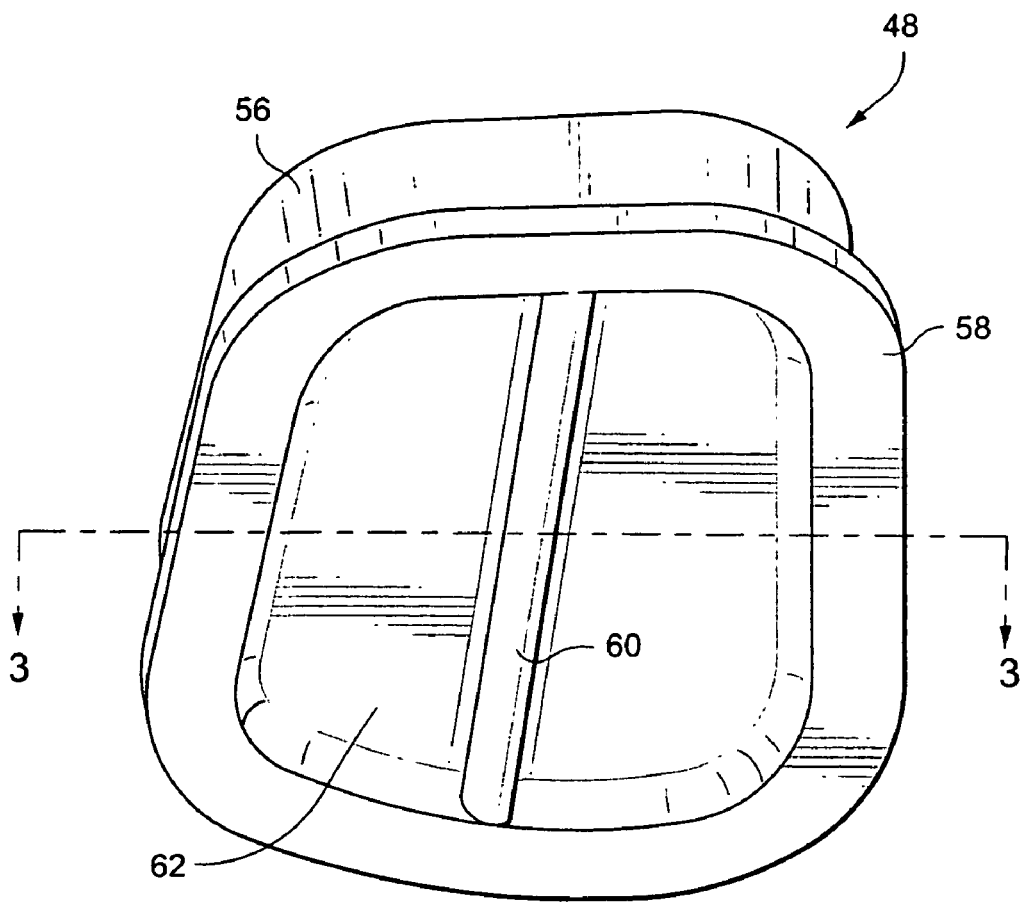
FIG. 2 is a perspective view of the underside of a plug used to close a core support hole in the tip portion of the blade, incorporating a turbulator in accordance with an exemplary embodiment.
Figure 3:
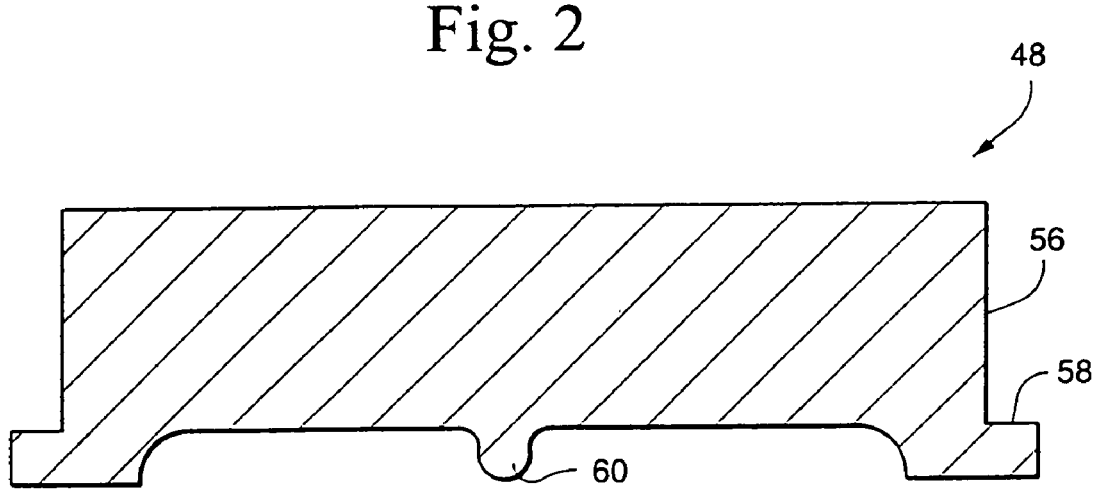
FIG. 3 is a cross-section taken along the line 3-3 of FIG. 2.

Turning now to FIG. 2, the plug 48 has a peripheral wall 56 with a flange 58 at the radially inner end of the peripheral wall. The flange is part of a plug retention system and may also provide some measure of heat transfer enhancement. The turbulence enhancing mechanism or device in the exemplary embodiment is in the form of an elongated rib turbulator 60 of generally square or rounded cross-section, that extends across a recessed area 62 formed on the underside of the plug, within the confines of the lower flange 58. The rib turbulator 60 may be oriented perpendicular to the flow direction at the tip, parallel to the direction of flow as in the case of the cooling fin, or at an angle (for example, diagonally) across the tip turn. Alternatively, the rib may be provided in the form of a chevron-shape to provide other effects on heat transfer enhancement and pressure drop through the turn. In the presently preferred arrangement, a single rounded rib is arranged perpendicular to the direction of flow. The invention is not limited to "rib" turbulators but encompasses any equivalent turbulence-enhancement device.

Figure 4:
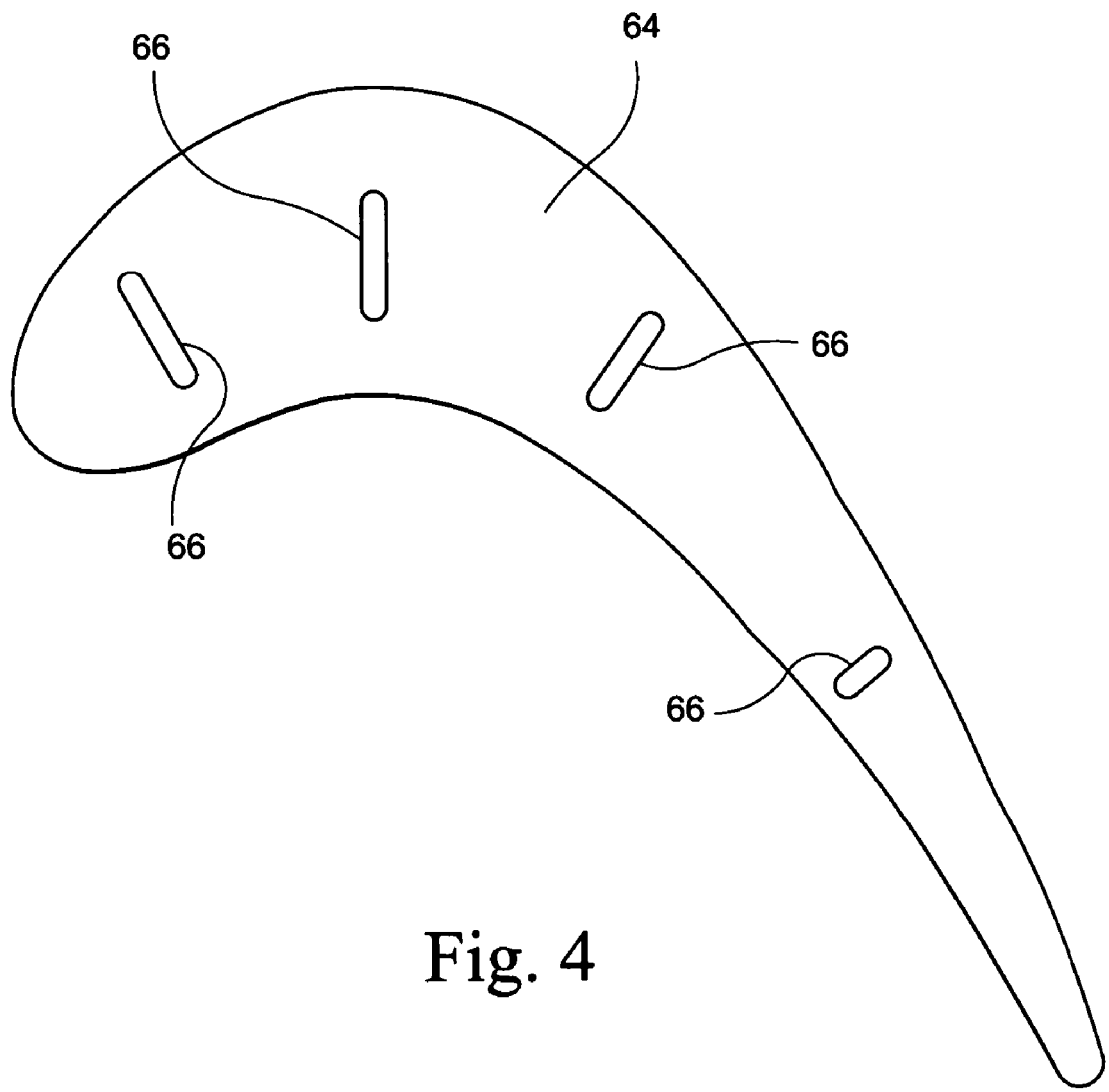
FIG. 4 is a bottom plan view of an airfoil tip cover plate formed with turbulators in accordance with another embodiment of the invention.

In an alternative arrangement, shown in FIG. 4, a single plate 64 could be utilized to close the holes in the tip of the airfoil portion. In this case, the plate would extend over most or all of the tip, and be formed with a plurality of turbulence-enhancement ribs 66, with each such rib located to project through a respective hole in the tip of the airfoil portion and into a single respective tip turn of the internal closed-loop cooling circuit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine blade having a shank portion and an airfoil portion with leading and trailing edges and a radially outer tip; an internal closed-loop cooling circuit within the airfoil portion including at least one radial outflow passage and at least one radial inflow passage connected by at least one respective tip turn at the radially outer end of the airfoil portion adjacent said radially outer tip, said at least one tip turn having a single elongated turbulence-enhancement device formed on an underside of, and extending substantially across, said radially outer tip, said device projecting into said tip turn, and wherein said radially outer tip includes a plurality of core support holes, each hole closed by a plug.

2. The turbine blade of claim 1 wherein said single turbulence-enhancement device comprises a rib.

3. The turbine blade of claim 2 wherein said rib has a generally square cross-section.

4. The turbine blade of claim 2 wherein said rib has a generally rounded cross-section.

5. The turbine blade of claim 2 wherein said rib extends in a direction of cooling steam flow through the tip turn.

6. The turbine blade of claim 2 wherein said rib extends in a direction perpendicular to a direction of cooling steam flow through the tip turn.

7. The turbine blade of claim 2 wherein said rib extends in a direction diagonal to the direction of cooling steam flow through the tip turn.

8. The turbine blade of claim 2 wherein said rib is substantially chevron-shaped.

9. The turbine blade of claim 1 wherein said single turbulence-enhancement device comprises an elongated rib formed on an underside of said plug.

10. A turbine blade having a shank portion and an airfoil portion with leading and trailing edges and a radially outer tip; an internal closed-loop serpentine cooling circuit within the airfoil portion including plural radial outflow passages and plural radial inflow passages connected by plural respective tip turns at the radially outer end of the airfoil portion, and including a plurality of core support holes in said radially outer tip, each hole closed by a plug having not more than one elongated rib extending substantially across an underside of the plug, and projecting into a respective one of said tip turns.

11. The turbine blade of claim 10 wherein said rib has a generally square cross-section.

12. The turbine blade of claim 10 wherein said rib has a generally rounded cross-section.

13. The turbine blade of claim 10 wherein said rib extends in a direction of cooling steam flow through the tip turn.

14. The turbine blade of claim 10 wherein said rib extends in a direction perpendicular to a direction of cooling steam flow through the tip turn.

15. The turbine blade of claim 10 wherein said rib extends in a direction diagonal to the direction of cooling steam flow through the tip turn.

16. The turbine blade of claim 10 wherein said rib is substantially chevron-shaped.

17. A turbine blade having a shank portion and an airfoil portion with leading and trailing edges and a radially outer tip; an internal closed-loop serpentine cooling circuit within said airfoil portion including plural radial outflow passages and plural radial inflow passages connected by plural respective tip turns at said radially outer tip, and including a plurality of core support holes in said radially outer tip closed by a single plate covering said plurality of core support holes, said plate having a plurality of ribs extending across an underside of said plate, but not more than one elongated rib on the underside of the plate projecting into a respective one of said tip turns.

18. A method of enhancing heat transfer in a respective, closed-loop cooling circuit formed within an airfoil portion of a gas turbine blade, said circuit including a plurality of radial outflow passages and a plurality of radial inflow passages connected by respective tip turns adjacent an airfoil tip having core support holes therein, the method comprising:

a) closing said core support holes with respective plugs; and b) forming a single elongated rib on an underside of each plug, such that said rib extends across an underside of the plug and projects into said tip turn.

19. The method of claim 18 wherein said rib has a substantially square cross-section.

20. The method of claim 18 wherein said rib has a generally rounded cross-section.

21. The method of claim 18 wherein said rib extends in a direction diagonal to the direction of cooling steam flow through the tip turn.

22. The method of claim 18 wherein said rib extends in a direction of cooling steam flow through the tip turn.

23. The method of claim 18 wherein said rib extends in a direction perpendicular to a direction of cooling steam flow through the tip turn.

24. The method of claim 18 wherein said rib is substantially chevron-shaped.

\* \* \* \* \*

UNITED STATES PATENT AND TRADEMARK OFFICE
CERTIFICATE OF CORRECTION

| | | |
|---|---|---|
| PATENT NO. | : 7,544,043 B2 | Page 1 of 1 |
| APPLICATION NO. | : 11/491957 | |
| DATED | : June 9, 2009 | |
| INVENTOR(S) | : Eastman et al. | |

It is certified that error appears in the above-identified patent and that said Letters Patent is hereby corrected as shown below:

At column 1, line 18, delete "erected through holes" and insert --ejected through holes--.

At column 1, line 61, delete "the top of the turbine blade" and insert --the tip of the turbine blade--.

Signed and Sealed this

Fourteenth Day of July, 2009

JOHN DOLL
*Acting Director of the United States Patent and Trademark Office*